No. 825,006. PATENTED JULY 3, 1906.
G. S. RUSSELL.
COMBINED CAMERA SUPPORT AND WALKING STICK, UMBRELLA, &c.
APPLICATION FILED AUG. 7, 1905.
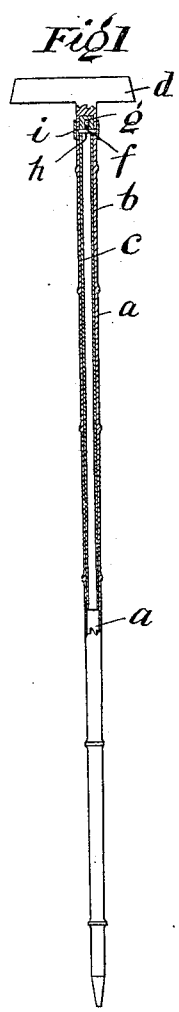
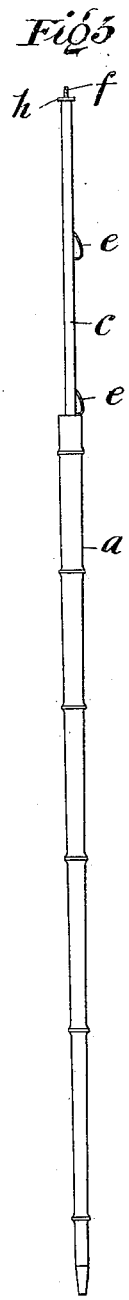
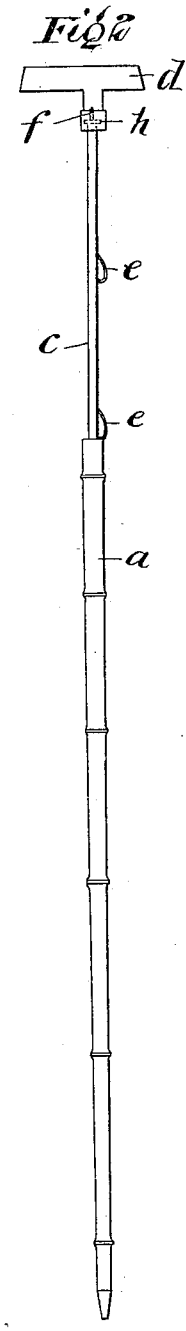

UNITED STATES PATENT OFFICE.

GEORGE STRATTEN RUSSELL, OF LONDON, ENGLAND.

COMBINED CAMERA-SUPPORT AND WALKING-STICK, UMBRELLA, &c.

No. 825,006.          Specification of Letters Patent.          Patented July 3, 1906.

Application filed August 7, 1905. Serial No. 273,109.

*To all whom it may concern:*

Be it known that I, GEORGE STRATTEN RUSSELL, a subject of His Majesty the King of Great Britain, and a resident of 38 Clarence Gate Gardens, Regents Park, London, N. W., England, have invented certain new and useful Improvements in a Combined Camera-Support and Walking-Stick, Umbrella, or the Like, (for which I have made application for patent in Great Britain, No. 14,462, dated July 13, 1905,) of which the following is a specification.

This invention relates to an improved construction of walking-stick, umbrella, or the like which may also be used as a temporary support for a hand-camera.

The object of the invention is to overcome the difficulty the user of a hand-camera finds in holding the camera perfectly still during exposure without the aid of supporting means, such as a tripod or like stand, to carry which does not add to convenience and comfort in traveling, touring, &c., whereas the support according to my invention may be used as a walking-stick or umbrella in the ordinary way and when required as a support for the camera may be quickly and easily arranged therefor.

In order that my invention may be readily and clearly understood, I have hereunto appended a sheet of drawings, in which—

Figure 1 is a part sectional elevation of a walking-stick adapted for use when required as a temporary camera-support, Figs. 2 and 3 illustrating how such a stick as at Fig. 1 may be arranged for supporting a camera.

In carrying my invention into effect I provide as the stem of a walking-stick, umbrella, or the like a hollow or partly hollow rod $a$, of metal, wood, bamboo, or other suitable material. Into such tube $a$, with or without this having a metal lining $b$, is fitted a rod or tube $c$, arranged at its upper end to form or have secured thereto a handle $d$ and provided with a number of height-adjusting springs $e$ or spring-controlled stops, studs, or equivalent means. The mode of fastening such handle $d$ to the rod or tube $c$, when these are formed separate, may conveniently be detachably effected by arranging the handle to screw onto a threaded stud $f$, formed or provided at the top of the rod or tube $c$. By way of example the handle $d$ is shown with an internally-threaded metal or other inserted piece $g$ fixed thereto for the purpose of screwing onto the stud $f$, which for preference is arranged with the standard thread used on tripod-stands.

As shown, the rod or tube $c$ may be provided at its upper end with a collar $h$ to prevent its being pushed too far into the tube $a$, while in order to prevent undue strain being thrown on the screw $f$ the handle $d$ may have a collar, ring, or the like $i$ secured thereto, which when the device is in use as a walking-stick, &c., extends down around the tube $a$, as at Fig. 1.

In the preferred construction the upper surface of the handle is formed quite straight and may, if desired, be arranged flat as well.

A device constructed substantially as herein described may when closed up, as at Fig. 1, be used as and present the appearance of an ordinary walking-stick or umbrella, if in the latter case the stem $a$ be arranged to form the stick of the umbrella, as obviously it readily may be, while in either case when a temporary support for a camera is required the rod or tube $c$ may be drawn a suitable distance out of the stem $a$, as at Fig. 2, so that the operator may rest the camera upon the handle $d$ away from the body, thereby enabling him or her to keep the camera steady and uninfluenced by the action of breathing during such time as the exposure is taking place.

Where a camera has been provided with a standard thread for attachment to a tripod, the handle $d$ may when formed detachable, as described, and after the rod or tube $c$ has been drawn out the required distance be removed, if desired, as shown in Fig. 3, in which case the camera may be fitted onto the screw $f$ while a photograph or photographs is or are to be taken.

In use as a temporary camera-support the springs or the like $e$ (of which, although only two are shown, any number may be employed) serve both to retain the rod or tube $c$ in the required position and to enable the operator to regulate or determine the distance the said rod or tube is to be withdrawn.

Having now described my invention, what I desire to secure by Letters Patent is—

1. In combination, a hollow stem, a lining therefor, a rod fitting within the stem, and a series of compressible springs carried by the rod adapted to engage the stem when said rod is partially withdrawn.

2. In combination, a hollow stem, a rod fitting within the stem, compressible springs carried by the rod adapted to engage an end of the stem, when the rod is partially withdrawn, and a handle which being attached to an end of the rod is movable therewith and adapted to form a rest for a camera.

3. In combination, a hollow stem, a lining therefor, a rod fitting within the stem, a series of compressible springs carried by the rod adapted to engage the stem when said rod is partially withdrawn, a handle having a collar attached to an end of the rod, said handle being movable with the rod and forming a rest for the camera.

In witness whereof I have hereunto set my hand in presence of two witnesses.

GEORGE STRATTEN RUSSELL.

Witnesses:
 HENRY CONRAD HEIDE,
 LEONARD COULSON.